S. M. WIXCEL.
AUTOMATIC HITCHING MECHANISM FOR VEHICLES.
APPLICATION FILED FEB. 12, 1912.
1,073,650.
Patented Sept. 23, 1913.
2 SHEETS—SHEET 1.
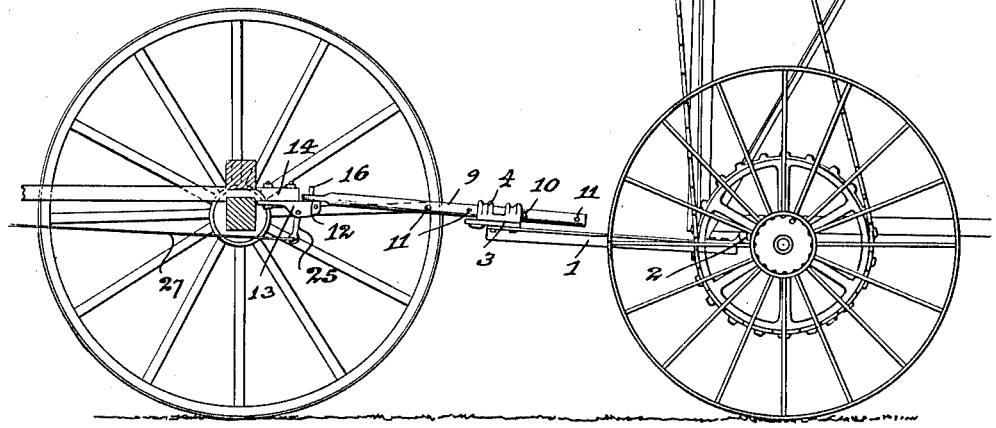
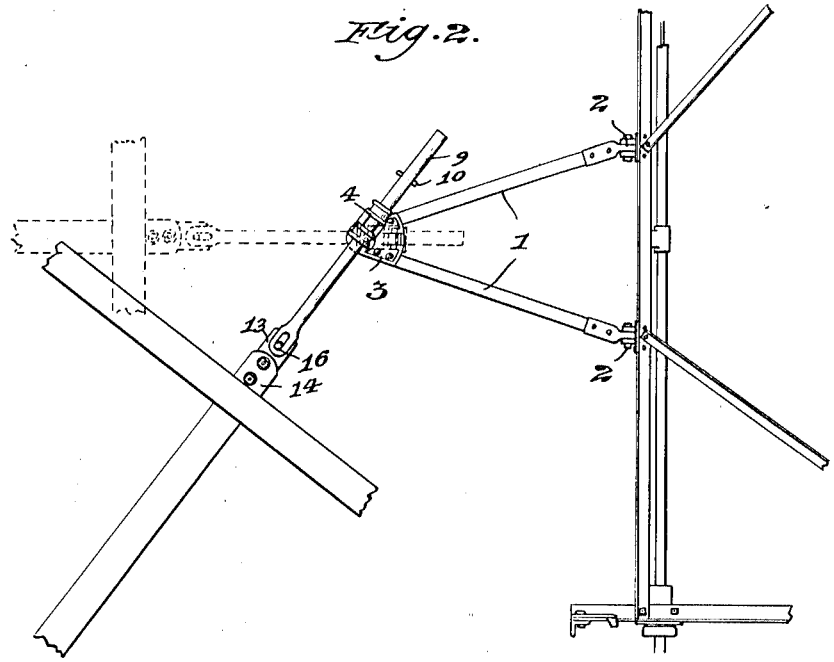

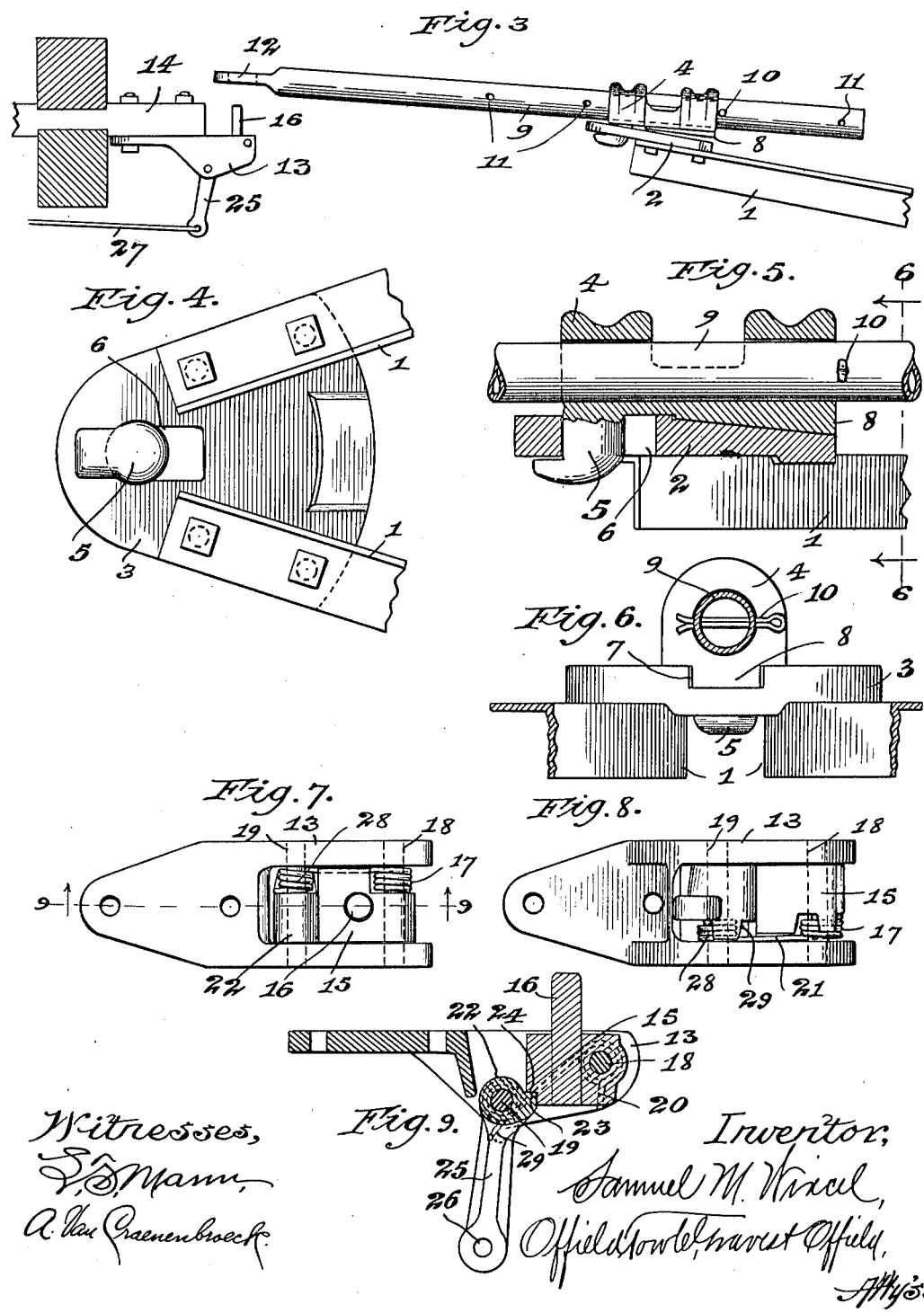

UNITED STATES PATENT OFFICE.

SAMUEL M. WIXCEL, OF MARCUS, IOWA.

AUTOMATIC HITCHING MECHANISM FOR VEHICLES.

1,073,650.

Specification of Letters Patent. Patented Sept. 23, 1913.

Application filed February 12, 1912. Serial No. 676,987.

*To all whom it may concern:*

Be it known that I, SAMUEL M. WIXCEL, a citizen of the United States, residing at Marcus, in the county of Cherokee and State of Iowa, have invented certain new and useful Improvements in Automatic Hitching Mechanisms for Vehicles, of which the following is a specification.

This invention relates to improvements in automatic hitching mechanisms, and refers more particularly to a mechanism by means of which a trailer vehicle may be hitched onto a leading vehicle, as for example a hay loader onto a hay wagon.

Among the salient objects of the invention are to provide a simple mechanism whereby a coupling may be effected readily and conveniently without regard to the particular angle at which a trailer vehicle stands with reference to a leading vehicle; to provide in such a mechanism means whereby the connecting link or coupling bar automatically becomes locked in centrally alined position as soon as the two vehicles have once been drawn into alinement with each other, so that the point of flexing between the two vehicles is transferred to a point sufficiently in rear of the hind wheels of the leading vehicle to prevent interference between the wheels of the two vehicles; to provide mechanism of the general character described which may be readily and easily unlocked through the action of a trip cord leading to a remote point, for example to the top of a load of hay; to provide a mechanism the parts of which are so constructed and designed as to be cheaply and efficiently made from structural metal and castings; to provide a mechanism so organized that the mere placing of the eye of the coupling bar over a stud initiates the coupling action and the remainder of such action is performed automatically when the leading vehicle exerts a draft upon the trailing vehicle, thus enabling the driver to perform this initial coupling action, then mount the leading vehicle, drive ahead and pay no further attention to the matter of coupling the vehicles together; and in general, to provide a simple and improved mechanism of the character referred to.

To the above ends the invention consists in the matters hereinafter described, and more particularly pointed out in the appended claims.

The invention will be readily understood from the following description, reference being had to the accompanying drawings, in which—

Figure 1 is a view partly in side elevation and partly in vertical section of the rear part of a farm wagon and the front wheel portions of a hayloader; these parts connected by the mechanism of the present invention; Fig. 2 is a fragmentary plan view of the coupling mechanism connected to parts of the respective vehicles shown in Fig. 1; Fig. 3 is a side elevation (the axle and bolster of the wagon being shown in vertical section) of the principal parts of the hitching mechanism; these parts being shown as about to be initially hitched together; Fig. 4 is a fragmentary detail in bottom plan of the forward end of that part of the coupling mechanism which is permanently attached to the trailer vehicle; Fig. 5 is a view partly in longitudinal vertical section and partly in side elevation of the swiveling member in which the coupling bar is slidably mounted; Fig. 6 is a sectional view of the parts shown in Fig. 5 taken approximately on the line 6—6 of Fig. 5 and looking in the direction of the arrows; Figs. 7 and 8 are top and bottom plan views, respectively, of the latch mechanism, of which the draft stud forms a part; Fig. 9 is a sectional view of the same mechanism taken on line 9—9 of Fig. 7 and looking in the direction of the arrows.

Referring to the drawings, 1 designates as a whole a V-shaped frame secured to any suitable cross-bar, axle or the like of a trailer vehicle, by means of suitable pivot bolts, as indicated at 2, 2, so that the frame may rise and fall vertically as to its free end. The forward end of this frame is formed by a casting 3 to which the divergent side frame members are rigidly and permanently bolted, as shown clearly in Figs. 2 and 4. Upon the casting 3 is mounted, so as to have swiveling and slightly tilting movement, a socket member 4. To this end the socket member is provided at its front end with a downwardly extending hook-bolt or stud 5 which enters a suitable aperture 6 in the casting 3; the aperture 6 taking the form of a slot, so that the parts may be readily assembled by hooking them together. In the upper side of the casting 3 at the center of the rear edge thereof is formed a groove 7 (see Fig. 6) and the under side of the socket member 4 (see Fig. 3) is provided with a corresponding rib or fin 8 adapted to engage the groove 7 and lock these parts in rigid alinement with each other when the rear end of the socket is depressed, but to permit the socket to swivel on its hook-bolt when its rear end is uplifted, as shown in Fig. 3.

The coupling bar 9 is mounted to slide endwise through the socket casting 4 and is provided with a cross-pin or key 10 which limits the extent to which it may be drawn forwardly through the socket. A series of key openings 11 is provided so that the operative length of the coupling-bar may be varied. The forward end of the coupling-bar is formed with an eye 12 adapted to hook easily over a draft-stud or pin forming a part of the latch mechanism now to be described.

13 designates as a whole a suitable casting or frame member, best shown in Figs. 7 and 8, and the forward end of which is fixedly bolted to a part of the wagon reach 14 which extends in rear of the axle (see Figs. 2 and 3). The rear end of the member 13 is divided fork-fashion, and between the two arms thereof is pivotally mounted a rocking block in which is rigidly seated (or it may be integrally formed therewith) a draft stud or pin 16. A coiled spring 17 wrapped around the pivot bolt 18 has one of its ends arranged to bear against a fixed part of the member 13, for example, another cross pin 19, and its other end engaged with a recess in the block 15, as indicated at 20 (Fig. 9); the spring being so tensioned as to tend to rotate the block 15 in counter clockwise direction to hold the draft-stud in upright position, and in a direction opposite to that in which it would be moved by a normal draft thereon. That part of the spring 17 which extends to and engages the bolt 19 forms a convenient stop and limits the swing of the block under the action of the spring 17; the block being recessed, as indicated at 21, Fig. 8, to properly engage the spring for this purpose.

To positively lock the rocker block against oscillation under the draft of the coupling bar engaged with its pin 16, a rocking dog 22 is mounted on the cross pin 19 and is provided with an angular shoulder 23 which engages a corresponding rabbet 24 in the front lower corner of the block 15. When this shoulder engages in the rabbet, block 15 can not be rotated in clockwise direction, and when the coupling bar 9 engages with the draft pin 16 the one vehicle will be drawn by the other. When it is desired to uncouple the trailing vehicle, the block 15 may be released by swinging the rear part of the dog downwardly to release shoulder 23 from the lower edge of the block, and to accomplish this movement said dog is provided with an extension or arm 25 terminating in an eye 26 to which a trip-cord 27 is attached and extended forwardly, as shown in Fig. 3. The rocking dog is automatically returned to its normal locking position by a second coiled spring 28 wrapped around a part of the bolt 19, as shown clearly in Fig. 7, and this spring is conveniently made integral with the spring 17. One end of the spring 28 is extended radially and engages a suitable lug 29 on the arm 25.

With the parts thus constructed, the operation of the device is as follows: Assume that the hay-wagon is driven in front of the hayloader so that the two vehicles bear the angular relation to each other indicated in Fig. 2. The coupling-bar, when disengaged from the preceding load, was left in straight alinement with the trailer vehicle, as indicated in the dotted lines in said Fig. 2. The driver picks up the frame 1 by one of its side bars, and the weight on the forward end of the coupling bar automatically tilts the latter downwardly so as to disengage the rib and groove 7, 8 (see Fig. 3), whereupon the driver swings the coupling-bar around into alinement with the latch mechanism, slides the coupling-bar endwise in one direction or the other, as required, and drops the eye of the bar over the draft-pin. He then mounts the leading vehicle and drives off. The draft obviously brings the two vehicles into alinement before he has proceeded far; and as soon as they reach alinement the first time the combined weight of the rear end of the coupling-bar and the front end of the frame 1 cause the rib and groove to interengage and remain interlocked, thus holding the two main parts of the hitch mechanism locked in alinement. Whatever flexing is necessary between the two vehicles thereafter takes place by the eye of the coupling-bar pivoting on the draft-pin.

The trip-cord 27 is ordinarily carried underneath the running gear of the wagon to the front of the hayrack and attached to the front ladder or upright of the latter at a point where the driver can get hold of it after the wagon has been loaded. After the wagon has been loaded, and the driver is ready to proceed to the barn, he cuts loose from the hayloader by simply pulling on the trip-cord while the two vehicles are still moving. The pull on the trip-cord rocks the locking dog to release the draft-pin, and the draft on the latter immediately tilts it rearwardly so that the coupling-bar slips off. Instantly when the coupling-bar slips off the spring throws the draft-pin back to its upright position, so that when the driver ceases pulling on the draft-cord the locking dog returns and locks the mechanism in its normal position.

It is obvious that modifications of the mechanism may be made and that its application to other uses may be made without departing from the invention and without evading the appended claims.

I claim as my invention:

1. In combination with a leading vehicle and a trailer vehicle, a hitching mechanism comprising a frame having one end pivotally connected with one of the vehicles whereby the frame is free to rise and fall on a horizontal axis and is held against lateral oscillation, a socketed guide member pivotally mounted upon said frame, interlocking means upon the frame and socket member whereby the latter may be held against pivotal movement when brought to a definite position, a coupling bar slidably mounted in said socketed guide member, a latch mechanism mounted upon the other vehicle and comprising an oscillatory block, an upstanding draft-stud upon the block, a spring normally returning the block to operative position, a locking dog for holding the block positively in operative position, and a trip-cord operatively connected with said locking dog and extending to a distance therefrom.

2. In a hitching mechanism, the combination of a frame member adapted to be pivotally connected at one end with one vehicle, a socket guide pivotally mounted upon the opposite end of said frame by means affording lateral swiveling movement upon the frame and limited oscillatory movement in a direction at right angles to the plane of swiveling movement, a locking rib on the meeting face of one of said members and a coöperating groove on the meeting face of the other member whereby the two may be locked against swiveling movement relatively to each other, a coupling bar mounted to slide endwise in said socket guide member and provided at one end with an eye, and a latching mechanism adapted to be mounted upon another vehicle and comprising a main frame, a draft-block movably mounted thereon, a draft-stud on said draft-block adapted to coöperate with the eye of the coupling-bar, a spring acting upon the draft-block to return it normally to operative position, a locking dog movably mounted and adapted to lock said draft-block positively in operative position, an operating arm or extension upon said locking dog, a trip-cord connected with said arm and extending thence to a distance, and a spring acting upon the locking dog to return the latter to normal locking position.

3. In combination with a vehicle, a support secured to the vehicle, a guide frame on said support and adapted for vertical and lateral oscillation thereon, a draft link supported in said guide frame, interlocking mechanism for locking said frame to said support to prevent lateral oscillation of said frame, said interlock being broken upon vertical oscillation of said frame, whereby said frame may then be oscillated laterally.

4. In combination with a vehicle, a draft frame pivoted to the front axle of said vehicle, a supporting plate secured to the free end of said draft frame, a block pivoted to said plate and adapted to oscillate vertically and laterally with reference to said plate, a draft bar supported by and extending from said block, interlocking mechanism for locking said block to said plate and against lateral oscillation when said draft bar and draft frame are substantially parallel, said interlock being broken when said draft bar and draft frame are swung relatively vertically whereby said block and supported draft bar may then be swung laterally.

5. In combination with a vehicle, a draft frame pivoted to the vehicle front axle and extending forwardly therefrom, a supporting plate secured to the free end of said draft frame, a block pivoted at its outer end to said plate to swing vertically or laterally with reference to the plate, a draft bar supported by and extending from said block, tongue and groove interlocking mechanism at the rear ends of said plate and block for locking said block to the plate against lateral swing when said block is oscillated vertically against the plate, said interlock being broken when said block is swung vertically to disconnect its rear end from said plate whereby said block and draft bar are then free to be swung laterally.

S. M. WIXCEL.

Witnesses:
HARRY Z. FREEMAN,
FLOYD S. BARNES.